United States Patent
Tanaka et al.

(10) Patent No.: US 7,333,704 B2
(45) Date of Patent: Feb. 19, 2008

(54) MULTICHANNEL OPTICAL PATH CHANGING DEVICE AND ITS PRODUCTION METHOD

(75) Inventors: Toru Tanaka, Tochigi (JP); Hidehisa Nanai, Tokyo (JP); Yuji Yamamoto, Tochigi (JP); Motoyasu Nishimura, Tochigi (JP); Shigeki Sakaguchi, Tokyo (JP)

(73) Assignee: Central Glass Company, Limited, Ube-shi (JP)

( * ) Notice: Subject to any disclaimer, the term of this patent is extended or adjusted under 35 U.S.C. 154(b) by 141 days.

(21) Appl. No.: 10/575,564

(22) PCT Filed: Oct. 13, 2004

(86) PCT No.: PCT/JP2004/015062
§ 371 (c)(1),
(2), (4) Date: Apr. 12, 2006

(87) PCT Pub. No.: WO2005/038502
PCT Pub. Date: Apr. 28, 2005

(65) Prior Publication Data
US 2007/0140636 A1 Jun. 21, 2007

(30) Foreign Application Priority Data
Oct. 15, 2003 (JP) ............................. 2003-355423
Dec. 26, 2003 (JP) ............................. 2003-434318

(51) Int. Cl.
*G02B 6/10* (2006.01)
*G02B 6/26* (2006.01)
(52) U.S. Cl. ........................................ 385/129; 385/32
(58) Field of Classification Search ................. 385/14, 385/15, 31–32, 39, 47, 50, 129–132
See application file for complete search history.

(56) References Cited

U.S. PATENT DOCUMENTS 6,791,675 B2* 9/2004 Kikuchi et al. ............... 356/50
2005/0201707 A1* 9/2005 Glebov et al. .............. 385/132

FOREIGN PATENT DOCUMENTS

| JP | 4-27904 A | 1/1992 |
| JP | 2000-193838 A | 7/2000 |
| JP | 2002-169042 A | 6/2002 |

* cited by examiner

OTHER PUBLICATIONS

Raw Machine English-Language Translation of JP 2000-193838, 12 pages, translated on Oct. 16, 2007.*

*Primary Examiner*—Quyen P Leung
(74) *Attorney, Agent, or Firm*—Crowell & Moring LLP

(57) ABSTRACT

The present invention relates to a multichannel optical path changing device that is constituted of resin optical waveguides and mirrors and that changes a direction of an optical path. This device has monolithically formed cores having a mirror therebetween and optical path directions changed, and has multichannel cores simultaneously formed under a condition that their positional relationship is maintained. This device can be produced by a first or second method. The first method comprises steps of forming a parallelepiped block on a substrate by a cladding resin; forming a film of a core layer to cover the block by a core resin; and simultaneously forming cores having an optical path direction rectangularly changed, by selectively etching the core layer and the block. The second method comprises steps of forming a film of a core layer on a substrate by a resin; and simultaneously forming a plurality of cores having an optical path rectangularly changed, by selectively etching the core layer, under a condition that their positional relationship is maintained.

3 Claims, 7 Drawing Sheets

(A)

(B)

(A)

(B)

(a)

(b)

(d)

(c)

(e)

MULTICHANNEL OPTICAL PATH CHANGING DEVICE AND ITS PRODUCTION METHOD

TECHNICAL FIELD

It is necessary to have a multichannel optical path changing device that changes the direction of the way of an optical circuit in order to have an efficient connection between devices and prevalence of optical waveguide devices. The present invention relates to a multichannel optical path changing device that has little loss and even characteristics and to its effective production method.

BACKGROUND OF THE INVENTION

As optical communication technique penetrates as a basic technique of the information communication system, optical waveguide becomes more and more important as an optical network key device, and its development is proceeding toward the application to optical electronic circuit wiring substrate and the like. For prevalence of optical waveguide devices, the price reduction and the mass production are desired. Resin-made optical waveguides, which are easy in handling, have been developed as their powerful candidates. As waveguide-use resin materials, there are used fluorinated polyimide resin, deuterated polysiloxane resin, epoxy resin, perfluorinated alicyclic resin, acrylic resin, silicone resin and the like.

For prevalence of optical waveguide devices, it is necessary to have an optical path changing technique that sharply bends an optical circuit in order have an efficient connection between devices, particularly a multichannel optical path changing device that can send and receive a plurality of optical signals in parallel, such as 2-16 channels. Furthermore, there is a demand for an optical path changing device that has little loss, even characteristics between channels, and low cost.

As an optical path changing member, there is proposed a multichannel optical path changing member produced by opposing inclined end surfaces of a pair of optical waveguides that have the inclined end surfaces at one ends and roughly identical inclination angles of the inclined end surfaces and the optical waveguide core sizes, arrangements and the like in the inclined end surfaces, by connecting the inclined end surfaces with each other in a manner that the cores of the waveguides in the inclined end surfaces roughly coincide with each other, by fixing the pair of optical waveguides to have a rough V-shape, by removing an apex portion of the V-shaped optical waveguide to expose the core to a predetermined position, by laminating in parallel ones provided with reflecting surfaces at predetermined intervals, and by covering that with a substance having a refractive index lower than that of the core (see Patent Publication 1).

However, it is necessary to have precision operations such as a step of producing waveguides having inclined surfaces that conform to each other, a step of attaching these, and the like. Therefore, the steps are complicated. It tends to have a positional displacement between a vertical waveguide and a horizontal waveguide by separately producing the horizontal waveguide and the vertical waveguide. Thus, loss is likely to increase.

Furthermore, there is proposed a method in which a waveguide is horizontally formed on a substrate, then a reflecting mirror is formed, then a cladding layer film is formed, then a vertical opening portion is formed on the horizontal waveguide, and then light is passed through a hollow portion (see Patent Publication 2).

In this case, there occur light reflection and scattering at a boundary between the core and the hollow portion, and thereby loss increases. Even in case that the hollow portion is filled with a core material, there is likely to occur a positional displacement between the vertical waveguide and the horizontal waveguide, since the horizontal waveguide and the vertical waveguide are separately produced. Furthermore, an interface is generated at a core boundary between the horizontal portion and the vertical portion. This becomes a cause of the loss increase.

Patent Publication 1: Japanese Patent Laid-open Publication 2001-194540

Patent Publication 2: Japanese Patent Laid-open Publication 2000-193838

SUMMARY OF THE INVENTION

It is an object of the present invention to provide, in a multichannel optical path changing device that changes a plurality of optical paths by using mirrors, an optical path changing device that has low loss and even characteristics between channels, and a production method having operation easiness and low cost.

According to the present invention, there is provided, in a multichannel optical path changing device that is constituted of resin optical waveguides and mirrors and that changes a direction of an optical path, a resin-made multichannel optical path changing device that has monolithically formed cores having a mirror therebetween and optical path directions changed, and that has multichannel cores simultaneously formed under a condition that their positional relationship is maintained.

The above multichannel optical path changing device can be produced by a first or second method of the present invention.

The first method of the present invention includes steps of forming a parallelepiped block on a substrate by a cladding resin; forming a film of a core layer to cover the block by a core resin; and simultaneously forming cores having an optical path direction rectangularly changed, by selectively etching the core layer and the block.

The second method of the present invention includes steps of forming a film of a core layer on a substrate by a resin; and simultaneously forming cores having an optical path rectangularly changed, by selectively etching the core layer, under a condition that their positional relationship is maintained.

BRIEF DESCRIPTION OF THE DRAWINGS

In the steps (the first method) of producing a multichannel optical path changing device.

In the steps of producing a multichannel optical path changing device in the method of FIG. 4.

DETAILED DESCRIPTION

According to the present invention, vertical and horizontal portions of a waveguide core are monolithically formed in a wafer process. Therefore, it is possible to provide a multichannel optical path changing device with stable characteristics, high precision, low loss and low cost.

In the following, the first method of the present invention is exemplarily described.

Figure 1:
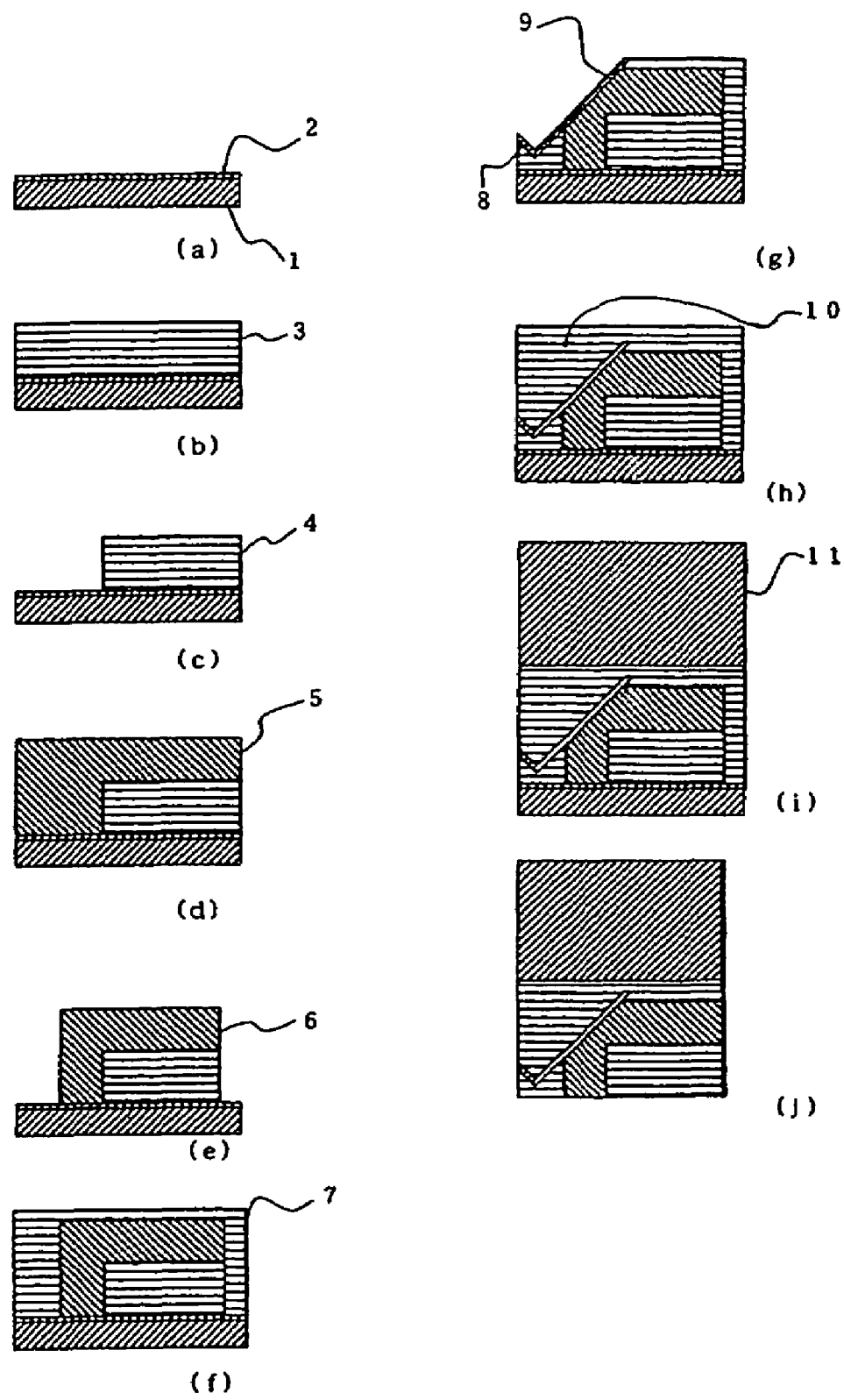
FIG. 1 is a view showing an example of steps of producing a multichannel optical path changing device according to the first method of the present invention.

FIG. 1(a) to FIG. 1(j) are views illustrating one example of steps of producing a multichannel optical path changing device of the present invention. A multichannel optical path changing device is produced by the following steps. In FIG. 1(a), a film of a sacrifice layer 2, which is a metal film that dissolves in acid, is formed on a temporary substrate by using a technique such as magnetron sputtering. The sacrifice layer 2 may be made of a water-soluble resin.

Figure 2:
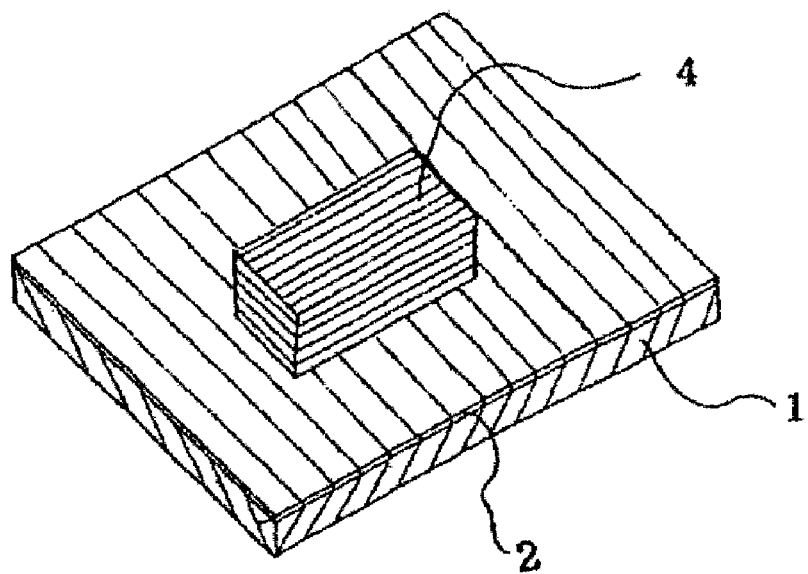
FIG. 2(A) shows a cladding block.
FIG. 2(B) shows a core in which a horizontal portion and a vertical portion are monolithically formed.
Figure 2:
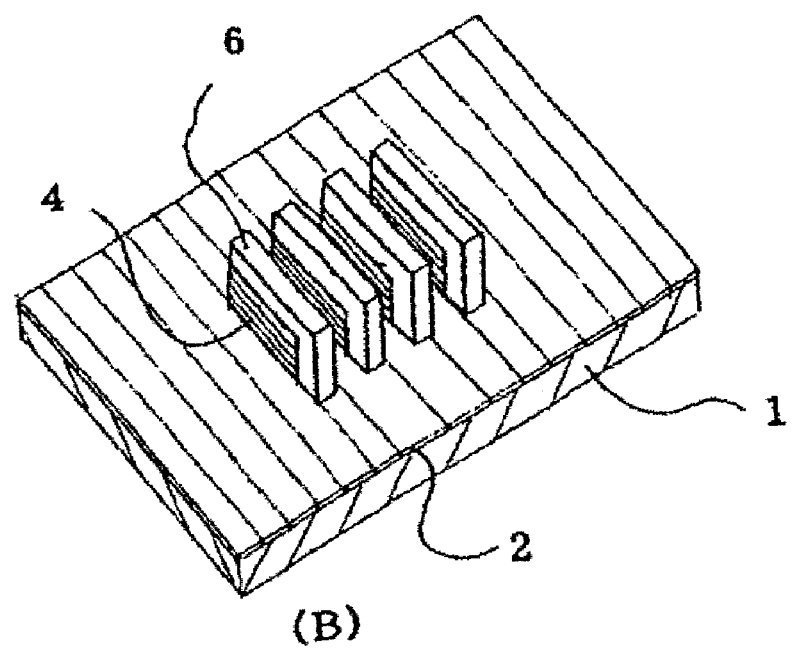

In FIG. 1(b), a film of a cladding layer 3 is formed. In FIG. 1(c), a cladding block 4 is produced by a technique of photolithography and Reactive Ion Etching (RIE). This block 4 is parallelepiped. Regarding its size, a size that is necessary for an optical path changing device to be produced is suitably selected. This block may be produced for each device. However, it is also preferable to produce continuous ones at one time in line for parallel devices. A perspective view of the cladding block 4 is shown in FIG. 2(A). In this step, the production is possible by a direct exposure method, mold method, or a method using a dicing saw. In FIG. 1(f), the entire surface is filled with a cladding layer 7.

In FIG. 1(g), a V-groove is formed by a dicing saw, and a reflecting mirror 9 is formed by using a technique such as magnetron sputtering to form a mirror. As the reflecting mirror, there is used a metal film, a dielectric multilayer film or the like. To form the mirror surface, there is also preferable a method in which a prism having a reflecting film formed thereon is disposed in the V-groove and then it is fixed by adhesive or the like. Furthermore, it is also possible to make a cut of 45 degrees with a dicing saw, then insert a film having a reflecting film formed thereon thereinto, and then fix that with adhesive. In FIG. 1(h), the V-groove is filled with a cladding resin 10 to make the device surface flat. In FIG. 1(i), a substrate 11 is attached to the wavelength. As the substrate, it is possible to use a glass substrate, silicon substrate, resin substrate or the like. In FIG. 1(j), the sacrifice layer 2 is removed by acid or the like, then the temporary substrate 1 is removed, and then it is cut and separated into a multichannel optical path changing device by a dicing saw.

In the following, the second method of the present invention is exemplarily described.

Figure 4:
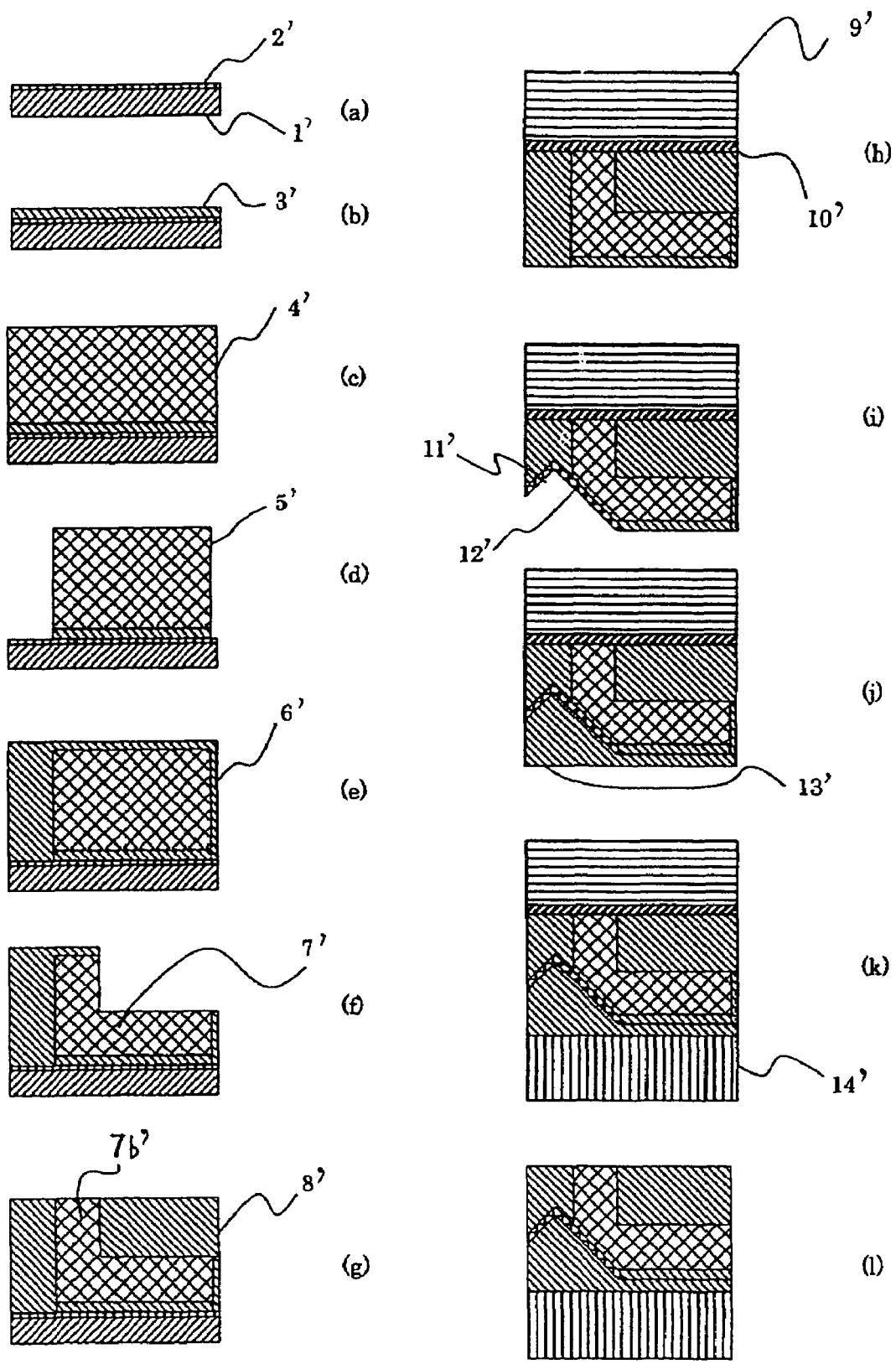
FIG. 4 is a view showing a first example of steps of producing a multichannel optical path changing device according to the second method of the present invention.
Figure 5:
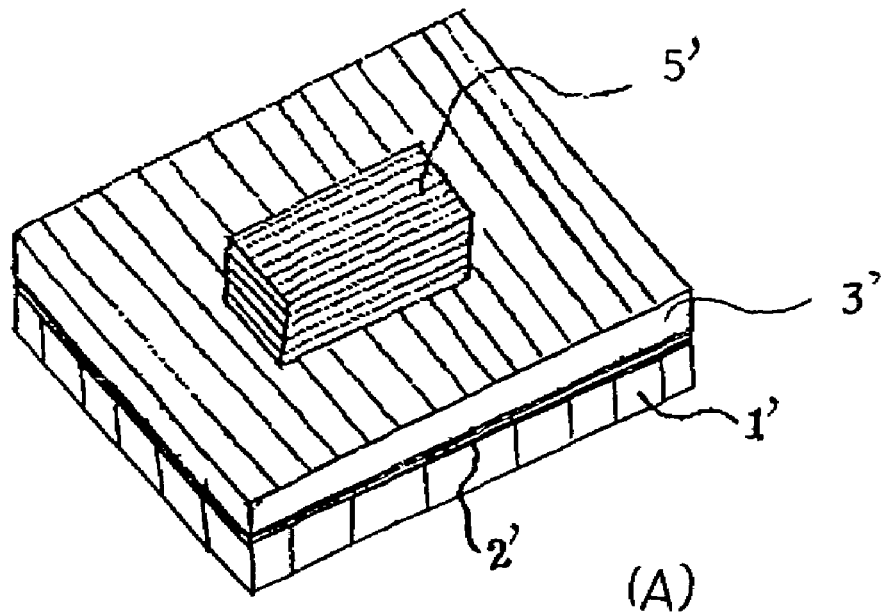
FIG. 5(A) shows a core block.
FIG. 5(B) shows a core in which a horizontal portion and a vertical portion are monolithically formed.
Figure 5:
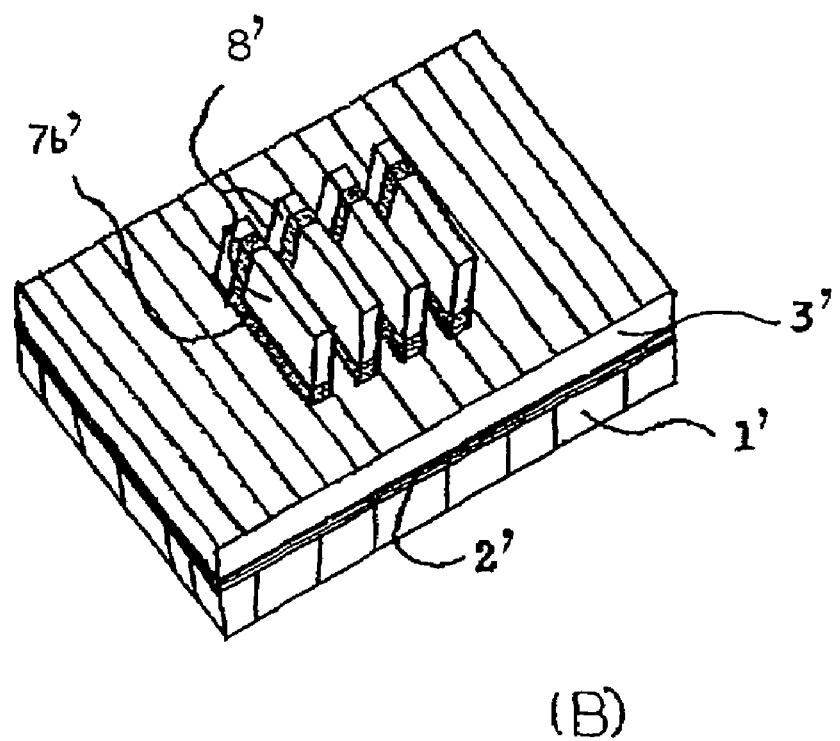

FIG. 4(a) to FIG. 4(l) are views illustrating the first example of the steps (the second method) of producing a multichannel optical path changing device of the present invention. A multichannel optical path changing device is produced by the following steps. In FIG. 4(a), a film of a sacrifice layer 2', which is a metal film of Al, Cu or the like that dissolves in acid, is formed on a first temporary substrate 1' by using a technique such as magnetron sputtering. The sacrifice layer 2 may be made of a water-soluble resin. In FIG. 4(b), a film of a cladding layer 3' is formed. In FIG. 4(c), a film of a core layer 4' is formed. In FIG. 4(d), a core block 5' is produced by a technique of photolithography and Reactive Ion Etching (RIE). This block 5' is parallelepiped. Regarding its size, a size that is necessary for an optical path changing device to be produced is suitably selected. This block may be produced for each device. However, it is also preferable to produce continuous ones at one time in line for parallel devices. A perspective view of the core block 5' is shown in FIG. 5(A). In this step, the production is possible by a direct exposure method, mold method, or a method using a dicing saw.

In FIG. 4(e), a film of a cladding layer 6' is formed to cover the core block 5'. In FIG. 4(f), an L-shaped core block is formed by removing a core resin of a part interposed between the core of a horizontal portion and the core of a vertical portion, which constitute an L-shape, by techniques of photolithography and Reactive Ion Etching. In FIG. 4(g), the entire surface is filled with a cladding layer 8', then the core resin and the cladding resin of unnecessary portions between channels and between devices are removed to form L-shaped cores 7' (7b'), then void spaces between channels and between devices are covered with cladding layers, and then the surface is subjected to a flattening treatment. FIG. 5(B) shows a perspective view of the multichannel cores 7' during this step. In FIG. 4(h), a second temporary substrate 9' is attached by an adhesive 10', the sacrifice layer 2' is removed by using an acid or the like, and the first temporary substrate 1' is removed. In FIG. 4(i), a V-groove is formed by a dicing saw, and a reflecting mirror 12' is formed at a corner portion by using a technique such as magnetron sputtering to form a mirror. As the reflecting mirror, there is used a metal film, a dielectric multilayer film or the like. To form the mirror surface, there is also preferable a method in which a prism having a reflecting film formed thereon is disposed in the V-groove and then it is fixed by adhesive or the like. Furthermore, it is also possible to make a cut of 45 degrees with a dicing saw, then insert a film having a reflecting film formed thereon thereinto, and then fix that with adhesive.

In FIG. 4(j), the V-groove is filled with a cladding resin 13' to make the device surface flat. In FIG. 4(k), a substrate 14' is attached to the waveguide. As the substrate, it is possible to use a glass substrate, silicon substrate, resin substrate or the like. In FIG. 4(l), the second temporary substrate 9' is removed, and then it is cut and separated into a multichannel optical path changing device by a dicing saw, thereby producing a multichannel optical path changing device.

Figure 7:
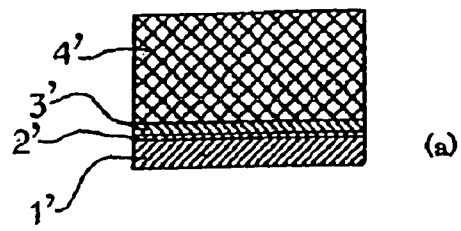
FIG. 7 is a view showing a second example of steps of producing a multichannel optical path changing device according to the second method of the present invention.
Figure 7:
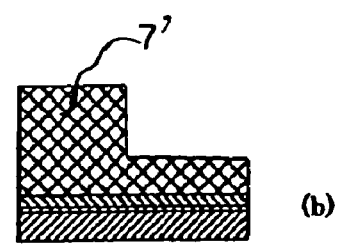
Figure 7:
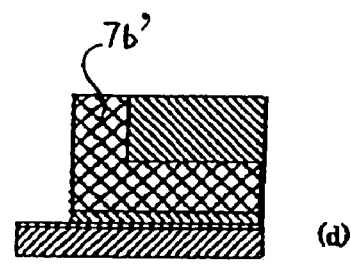
Figure 7:
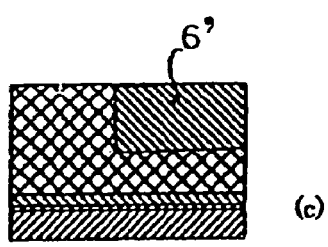
Figure 7:
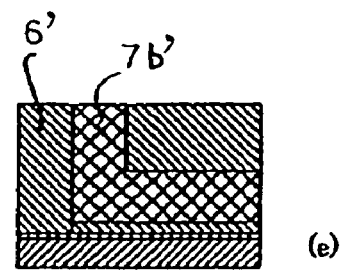

FIG. 7 is a view showing a second example of the method (second method) for producing a multichannel optical path chancing device according to the present invention.

Figure 8:
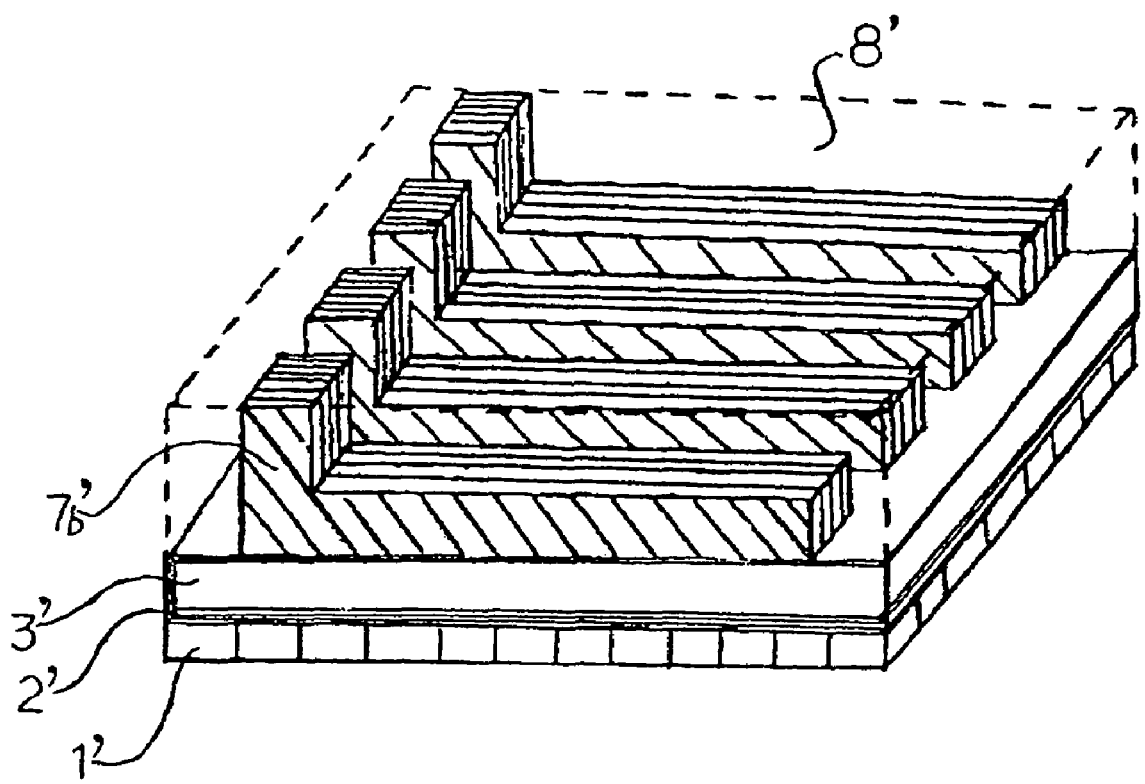
FIG. 8 shows a perspective view of a core in the step (e) of FIG. 7.

FIG. 7(a) shows one prepared by forming a film of a sacrifice layer 2' on a first temporary substrate 1' and then forming thereon a cladding layer 3' and a core layer 4'. In FIG. 7(b), a core resin of a part interposed between the core of a horizontal portion and the core of a vertical portion, which constitute an L-shape, is removed by conducing a selective etching by techniques of photolithography and Reactive Ion Etching, thereby forming an L-shaped core block. In FIG. 7(c), the removed portion is filled with a cladding resin. In FIG. 7(d), between waveguides and other core resin unnecessary portions are selectively removed to form L-shaped cores. Then, in FIG. 7(e), the removed portion is filled with a cladding resin, thereby simultaneously forming L-shaped cores under a condition that their respective positional relationships are maintained. FIG. 8 shows a perspective view upon this. After that, a multichannel optical path changing device is produced by a method similar to that of FIG. 4(*h*) to FIG. 4(*l*) in the first example.

It is possible by the above first and second methods to simultaneously produce many multichannel optical path changing devices at one time with stable characteristics and high precision by monolithically forming cores having an optical path direction changed and by simultaneously forming multichannel cores under a condition that their respective positional relationships are maintained.

Although the present invention relates to an optical path changing device that changes the direction of an optical path in a rectangular direction, it is easily possible to change an optical path at an angle other than right angle by adjusting inclination of the mirror portion.

In the following, the present invention is specifically explained by examples. However, the present invention is not limited by the examples. Example 1 corresponds to the first method of the present invention, and Examples 2-3 correspond to the second method of the present invention.

EXAMPLE 1

Four-channel optical path changing devices were produced. The size of a core section (E-E view in FIG. 3) is a square of 40 μm×40 μm, and the core pitch between channels is set to 0.25 mm.

At first, a film of a sacrifice layer was formed on a 4-inch temporary glass substrate by using a magnetron sputtering. Al (thickness: about 1 μm) was used as the sacrifice layer. Then, a film of a cladding layer was formed. As the cladding, epoxy resin was used, and the film was formed by spin coating. After the film formation, a flattening treatment was conducted by grinding and polishing to adjust the thickness of the cladding layer to 70 μm. Then, a film of a masking member was formed on the cladding layer, and a patterning was conducted by photolithography. Al was used for the masking member. A parallelepiped block of the cladding was produced by removing ($O_2$-RIE) an unnecessary portion of the cladding layer that is not protected with the mask layer through etching by allowing $O_2$ gas to flow thereinto. The cladding block was adjusted to 70 μm in height (A in FIG. 3) and to 1 mm in width (B in FIG. 3). In a direction perpendicular to the paper surface of FIG. 3, cladding blocks of devices aligned are monolithically formed in line.

Figure 3:
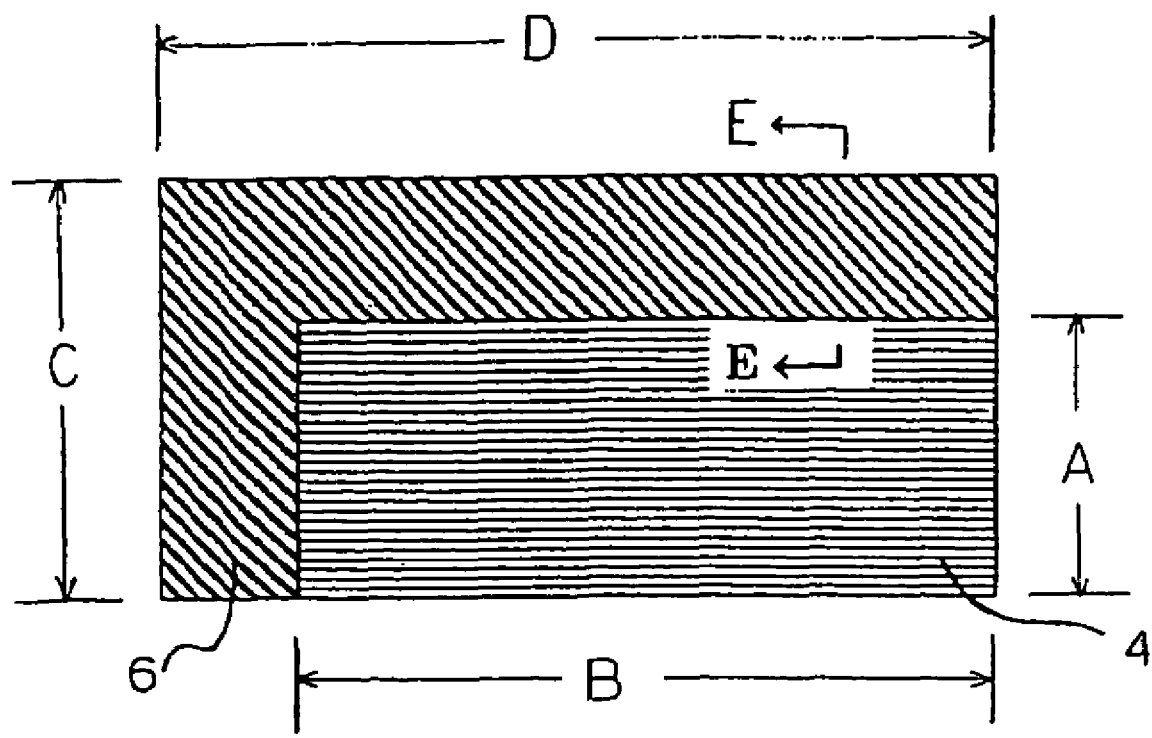
FIG. 3 is a view showing a relationship between a core block and a core in Example 1.

A film of a core layer was formed thereon by spin coating. As the core layer, epoxy resin was used. After the film formation, the top surface of the core layer was ground and polished to conduct a flattening treatment of the surface. With this, the core layer thickness was adjusted to 40 μm from the cladding block top. Then, a film of an Al masking member was formed on the core layer, and patterning was conducted by photolithography. Then, unnecessary portions of the core layer and the cladding block were removed by $O_2$-RIE, thereby producing a core that is rectangularly bent along the cladding block (FIG. 3). The core size is 40 μm×40 μm (E-E view in FIG. 3), and the horizontal portion and the vertical portion are the same in size. The length of the core vertical portion is 110 μm from the top end of the core horizontal portion (C in FIG. 3). The length of the core horizontal portion is 1,040 μm from the outer end of the core vertical portion (D in FIG. 3). Then, the entire surface was filled with a cladding resin. After the film formation, the top surface of the cladding resin was ground and polished to conduct a flattening treatment. Spin coating was used for filling of the cladding resin.

Then, a V-groove was formed at a right-angle bent portion of the core by a dicing saw to form a mirror surface. The mirror was formed in a manner to form an Au film only at the V-groove portion by magnetron sputtering. After forming the mirror surface, the V-groove was filled with a cladding resin, and a film of a cladding layer was formed. The surface was ground and polished to conduct a flattening treatment. Then, a glass substrate was attached to the cladding layer's top surface by using an epoxy adhesive. Then, the sacrifice layer was dissolved, and the temporary substrate was removed. To remove the sacrifice layer, a mixed liquid of copper sulfate, ferric chloride and water was used. Then, each device was cut and separated into squares of 2 mm×2 mm, thereby obtaining 803 pieces of four-channel optical path changing devices. Insertion loss was measured by transmitting a light of 1.3 μm in wavelength. With this, 667 pieces (83%) were found to have a waveguide insertion loss in the device of 3 dB or less and an insertion loss dispersion in the device of 0.1 dB or less. Thus, it was possible to produce homogeneous, four-channel, optical path changing devices at one time with high yield.

EXAMPLE 2

Four-channel optical path changing devices were produced. The size of a core section (K-K view in FIG. 6) is a square of 40 μm×40 μm, and the core pitch between channels is set to 0.25 mm.

At first, a film of a sacrifice layer was formed on a 4-inch temporary glass substrate by using a magnetron sputtering. Al (thickness: about 1 μm) was used as the sacrifice layer. Then, a film of a cladding layer of 10 μm was formed, and then a film of a core layer was formed. As the core, epoxy resin was used, and the film was formed by spin coating. After the film formation, a flattening treatment was conducted by grinding and polishing to adjust the thickness of the core layer to 120 μm. Then, a film of a masking member was formed on the core layer, and a patterning was conducted by photolithography. Al was used for the masking member. A parallelepiped block of the core was produced by removing ($O_2$-RIE) an unnecessary portion of the core layer that is not protected with the mask layer through etching by allowing $O_2$ gas to flow thereinto.

Figure 6:
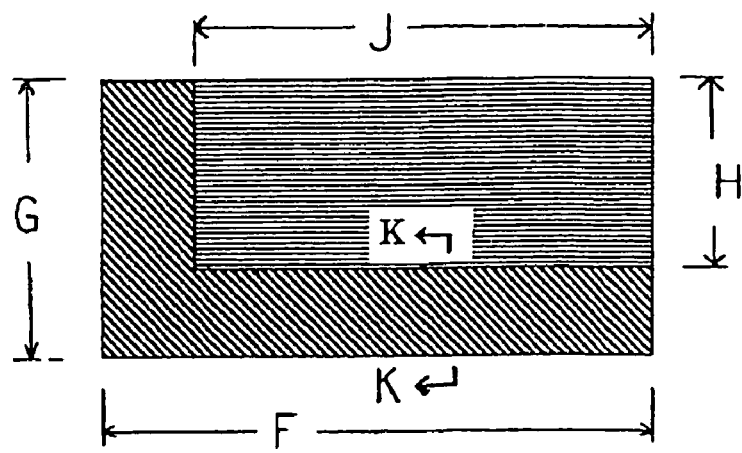
FIG. 6 is a view showing a relationship between a core block and a core in Example 2.

The core block was adjusted to 120 μm in height (G in FIG. 6) and to 1 mm in width (F in FIG. 6). In a direction perpendicular to the paper surface of FIG. 6, core blocks of devices aligned are monolithically formed in line.

A film of a cladding layer was formed thereon by spin coating. As the cladding layer, an epoxy resin was used. After the film formation, the top surface of the cladding layer was ground and polished to conduct a flattening treatment of the surface. With this, the cladding layer thickness was adjusted to 10 μm from the core block top. Then, a film of an Al masking member was formed on the cladding layer, and patterning was conducted by photolithography. Then, unnecessary portions of the cladding layer and the core block were removed by $O_2$-RIE, thereby producing a core that is rectangularly bent (FIG. 6).

The core size is 40 μm×40 μm (K-K view in FIG. 6), and the horizontal portion and the vertical portion are the same in size. The length of the core vertical portion is 120 μm from the bottom end of the core horizontal portion (G in FIG. 6). The length of the core horizontal portion is 1,000 μm from the outer end of the core vertical portion (F in FIG.

6). Then, the entire surface was filled with a cladding resin. After the film formation, the top surface of the cladding resin was ground and polished to conduct a flattening treatment. Spin coating was used for filling of the cladding resin. Then, a second temporary glass substrate was attached by an epoxy adhesive, the sacrifice layer was dissolved, and the first temporary substrate was removed. To remove the sacrifice layer, a mixed liquid of copper sulfate, ferric chloride and water was used.

Then, a V-groove was formed at a right-angle bent portion of the core by a dicing saw to form a mirror surface. The mirror was formed in a manner to form an Au film only at the V-groove portion by magnetron sputtering. After forming the mirror surface, the V-groove was filled with a cladding resin, and a film of a cladding layer was formed. The surface was ground and polished to conduct a flattening treatment. Then, a glass substrate was attached to the cladding layer's top surface by using an epoxy adhesive. Then, each device was cut and separated into squares of 2 mm×2 mm, thereby obtaining 780 pieces of four-channel optical path changing devices. Insertion loss was measured by transmitting a light of 1.3 µm in wavelength. With this, 618 pieces (79%) were found to have insertion losses of 3 dB or less and an insertion loss dispersion in each device of 0.1 dB or less. Thus, it was possible to produce homogeneous, four-channel, optical path changing devices at one time with high yield.

EXAMPLE 3

Four-channel optical path changing devices, which were the same as those of Example 2, were produced. The size is the same as that of Example 2. At first, a film of a sacrifice layer was formed on a 4-inch first temporary glass substrate by using a magnetron sputtering. Al (thickness: about 1 µm) was used as the sacrifice layer. Then, a film of a cladding layer (10 µm) was formed thereon, and then a film of a core layer was formed. As the core, epoxy resin was used, and the film was formed by spin coating. After the film formation, a flattening treatment was conducted by grinding and polishing to adjust the thickness of the core layer to 120 µm. Then, a film of a masking member was formed on the core layer, and a patterning was conducted by photolithography. Al was used for the masking member. The core resin of a portion interposed between the core of a horizontal portion and the core of a vertical portion, which constitute an L-shape, was removed by removing (O$_2$-RIE) an unnecessary portion of the core layer that is not protected with the mask layer through etching by allowing O$_2$ gas to flow thereinto (FIG. 7(b)). The thickness of the removed core resin was 80 µm, and, in a direction perpendicular to the paper surface of FIG. 7(a) to FIG. 7(e), the core resin was removed in line along a plurality of the devices. Then, the entire surface was filled with the cladding resin (FIG. 7(c)). Then, an unnecessary portion of the core of the vertical portion and the core resin and the cladding resin between channels and the devices were removed (FIG. 7(d); FIG. 8 shows a perspective view). Then, the entire surface was filled with the cladding resin. After the film formation, the top surface of the cladding resin was ground and polished to conduct a flattening treatment (FIG. 7(e)).

Then, a second temporary glass substrate was attached by an epoxy adhesive, the sacrifice layer was dissolved, and the first temporary substrate was removed. To remove the sacrifice layer, a mixed liquid of copper sulfate, ferric chloride and water was used.

Then, a V-groove was formed at a right-angle bent portion of the core by a dicing saw to form a mirror surface. The mirror was formed in a manner to form an Au film only at the V-groove portion by magnetron sputtering. After forming the mirror surface, the V-groove was filled with a cladding resin, and a film of a cladding layer was formed on the entire surface. The surface was ground and polished to conduct a flattening treatment. Then, a glass substrate was attached to the cladding layer's top surface by using an epoxy adhesive. Then, each device was cut and separated into a square of 2 mm×2 mm, thereby obtaining 780 pieces of four-channel optical path changing devices. Insertion loss was measured by transmitting a light of 1.3 µm in wavelength. With this, 603 pieces (77%) were found to have insertion losses of 3 dB or less and an insertion loss dispersion in each device of 0.1 dB or less. Thus, it was possible to produce homogeneous, four-channel, optical path changing devices at one time with high yield.

The invention claimed is:

1. A method for producing a resin-made, multichannel, optical path changing device, characterized in comprising six steps of:
    1) forming a film of a sacrifice layer on a temporary substrate;
    2) forming a film of a cladding layer thereon and selectively etching the cladding layer, thereby forming a parallelepiped block by the cladding resin;
    3) forming a film of a core layer by a core resin to cover the block;
    4) simultaneously forming a multichannel core having a core perpendicular to the substrate and a core parallel with the substrate, which are monolithically formed, by selectively etching the core layer and the block, and conducting a filling with a cladding resin;
    5) forming a V-groove at a corner portion of the core in order to form a mirror surface and forming a reflecting film as the mirror surface; and
    6) conducing a filling with a cladding resin, attaching a substrate thereon, and, after removing the temporary substrate and the sacrifice layer of the step 1), conducting a cutting and separation into multichannel optical path changing devices.

2. A method for producing a resin-made, multichannel, optical path changing device, characterized in comprising eight steps of:
    1) forming a film of a sacrifice layer on a first temporary substrate;
    2) forming a film of a cladding layer thereon;
    3) further forming a film of a core layer thereon and selectively etching the core layer, thereby forming a parallelepiped block by the core resin;
    4) forming a film of a cladding layer by a cladding resin to cover the block;
    5) simultaneously forming a multichannel core having a core perpendicular to the substrate and a core parallel with the substrate, which are monolithically formed, by selectively etching the core layer and the block, and conducting a filling with a cladding resin;
    6) attaching a second temporary substrate to an opposite surface of the first temporary substrate of the step 1) and removing the first temporary substrate and the sacrifice layer;
    7) forming a V-groove at a corner portion of the core in order to form a mirror surface and forming a reflecting film as the mirror surface; and
    8) conducing a filling with a cladding resin, attaching a substrate thereon, and, after removing the second temporary substrate of the step 6), conducting a cutting and separation into multichannel optical path changing devices.

3. A method for producing a resin-made, multichannel, optical path changing device, characterized in comprising eight steps of:
1) forming a film of a sacrifice layer on a first temporary substrate;
2) forming a film of a cladding layer thereon;
3) further forming a film of a core layer thereon and selectively etching the core layer, thereby forming an L-shaped block by the core resin;
4) filling an etched portion of the step 3) with a cladding resin;
5) simultaneously forming a multichannel core having a core perpendicular to the substrate and a core parallel with the substrate, which are monolithically formed, by selectively etching the core layer and the block, and conducting a filling with a cladding resin;
6) attaching a second temporary substrate to an opposite surface of the first temporary substrate of the step 1) and removing the first temporary substrate and the sacrifice layer;
7) forming a V-groove at a corner portion of the core in order to form a mirror surface and forming a reflecting film as the mirror surface; and
8) conducing a filling with a cladding resin, attaching a substrate thereon, and, after removing the second temporary substrate of the step 6), conducting a cutting and separation into multichannel optical path changing devices.

* * * * *